United States Patent [19]
Berman

[11] Patent Number: 5,906,491
[45] Date of Patent: May 25, 1999

[54] GEOGRAPHY TEACHING APPARATUS

[76] Inventor: Robert J. Berman, 521 Church Ave., Woodmere, N.Y. 11598

[21] Appl. No.: 08/823,729

[22] Filed: Mar. 26, 1997

Related U.S. Application Data

[60] Provisional application No. 60/014,234, Mar. 27, 1996.
[51] Int. Cl.[6] .................................................. G09B 29/00
[52] U.S. Cl. .......................................... 434/150; 434/368
[58] Field of Search .................................... 434/150, 147, 434/130, 406, 368; 273/157 R

[56] References Cited

U.S. PATENT DOCUMENTS

| | | | |
|---|---|---|---|
| 1,745,946 | 2/1930 | Murray | 434/130 |
| 1,907,382 | 5/1933 | Birdsall | 273/152 R |
| 2,199,499 | 5/1940 | Kreitler | 434/150 |
| 2,882,619 | 4/1959 | Gloeckner | 434/368 |
| 2,983,069 | 5/1961 | Birney et al. | 434/368 |
| 3,433,485 | 3/1969 | Renn et al. | 273/157 R |
| 4,052,074 | 10/1977 | Fogle et al. | 273/157 R |
| 4,673,197 | 6/1987 | Shtipelman et al. | 434/150 |
| 4,898,537 | 2/1990 | Pryor | 434/150 |
| 5,141,233 | 8/1992 | Hernandez | 434/150 |
| 5,178,542 | 1/1993 | Chigrinsky | 434/368 |
| 5,205,563 | 4/1993 | Dearing | 434/130 |
| 5,213,507 | 5/1993 | Ozrovitz | 273/157 R |
| 5,390,935 | 2/1995 | Wilkins | 273/157 R |
| 5,580,252 | 12/1996 | McCrady | 434/150 |

*Primary Examiner*—Paul J. Hirsch
*Attorney, Agent, or Firm*—Seth H. Ostrow

[57] ABSTRACT

A geography teaching apparatus has two working surfaces, such as on opposing sides of a substrate such as paper. The first working surface contains graphical images representing the outlines of countries, such as in a map of a continent. The second or opposing working surface contains graphical images which are identical in size and shape to the graphical images on the first surface, and are positioned in relative positions on the second surface which are identical to the relative positions of the graphical images on the first surface. The second surface also contains text such as the names of each of the countries shown and other information about the countries. Students study the second surface in an attempt to learn the textual information, and then turn the apparatus over to the first working surface and attempt to write down all the information they studied. The relatedness of the visual images reinforce the teaching process and improve memory retention.

12 Claims, 5 Drawing Sheets

GEOGRAPHY TEACHING APPARATUS

RELATED APPLICATIONS

Applicant hereby claims the benefit of provisional application Ser. No. 60/014,234 filed Mar. 27, 1996.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to a teaching apparatus and, in particular, to an apparatus for teaching geography which uses visual associations to help students remember geography.

Studies show that many Americans have a woefully inadequate knowledge of geography. Recent advances in computers and telecommunications have made it even more imperative for Americans to learn about their world and be familiar with the names and locations of countries and cities as well as various other information about the nations of the world and their lifestyles.

In this computerized age, students are increasingly becoming accustomed to learning through a highly visual and interactive environment. In fact, the use of visual images associated with textual information in an interactive environment, such as can be provided by a computer, is an effective method of helping students learn and remember facts. In addition, students tend to learn even more effectively when they are taught through games or other testing devices which challenge them and gauge their performance.

However, many schools are on tight budgets and can not afford to provide every student access to a computer. Also, it has been shown that writing words down allow for longer memory retention than simply clicking on a mouse to select an answer choice. Furthermore, computer programs, books, or atlases which are used to teach geography quickly become outdated in this fast-changing global environment. Therefore, a relatively inexpensive and easily replaceable mechanism is needed for teaching students geography. To the best of the inventor's knowledge, no such mechanism is currently commercially available. The present invention provides the heretofore missing geography teaching apparatus which provides students a fun, visually associative, interactive way of learning and memorizing geography, and which is relatively inexpensive and easily replaceable.

SUMMARY OF THE INVENTION

It is an object of the present invention to teach students geography.

It is another object of the present invention to provide an apparatus which helps students remember facts in an interactive and visually associative manner.

It is another object of the present invention to provide a relatively inexpensive and easily replaceable apparatus for teaching geography.

The above and other objects are achieved by a teaching apparatus comprising a first working surface upon which is illustrated a plurality of first graphical images in first shapes, sizes and relative positions on the first working surface and a second working surface coupled to the first working surface containing second graphical images which are substantially the same as the first graphical images and which have shapes, sizes and relative positions on the second working surface which are substantially the same as the first shapes, sizes and positions. In preferred embodiments, the first and second working surfaces are on opposite sides of a piece of paper. The second working surface further contains textual information relating to the second graphical images, the textual information being associated on the second working surface with the second graphical images.

When used to teach geography, the graphical images comprise outlines of countries (or regions or states) for all or part of the world and the textual information comprises names for each of the countries, each name being positioned on the second working surface on or near the corresponding country. The textual information may further comprise information relating to each of the countries, such as population, national religions, official languages, primary imports or exports, etc.

The above objects may also be achieved by a teaching apparatus comprising a substrate containing graphical images printed thereupon and a transparent sheet attached to one edge of the substrate such that the sheet may be laid over and aligned with the substrate. The transparent sheet contains textual information printed thereupon which relates to the graphical images and, when laid over the substrate, is positioned close to or on the graphical images.

A writing implement, preferably using easily erasable ink, may be attached to the apparatus.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

Two general arrangements of the geography teaching apparatus according to the present invention will be described herein with reference to the drawings.

Figure 1:
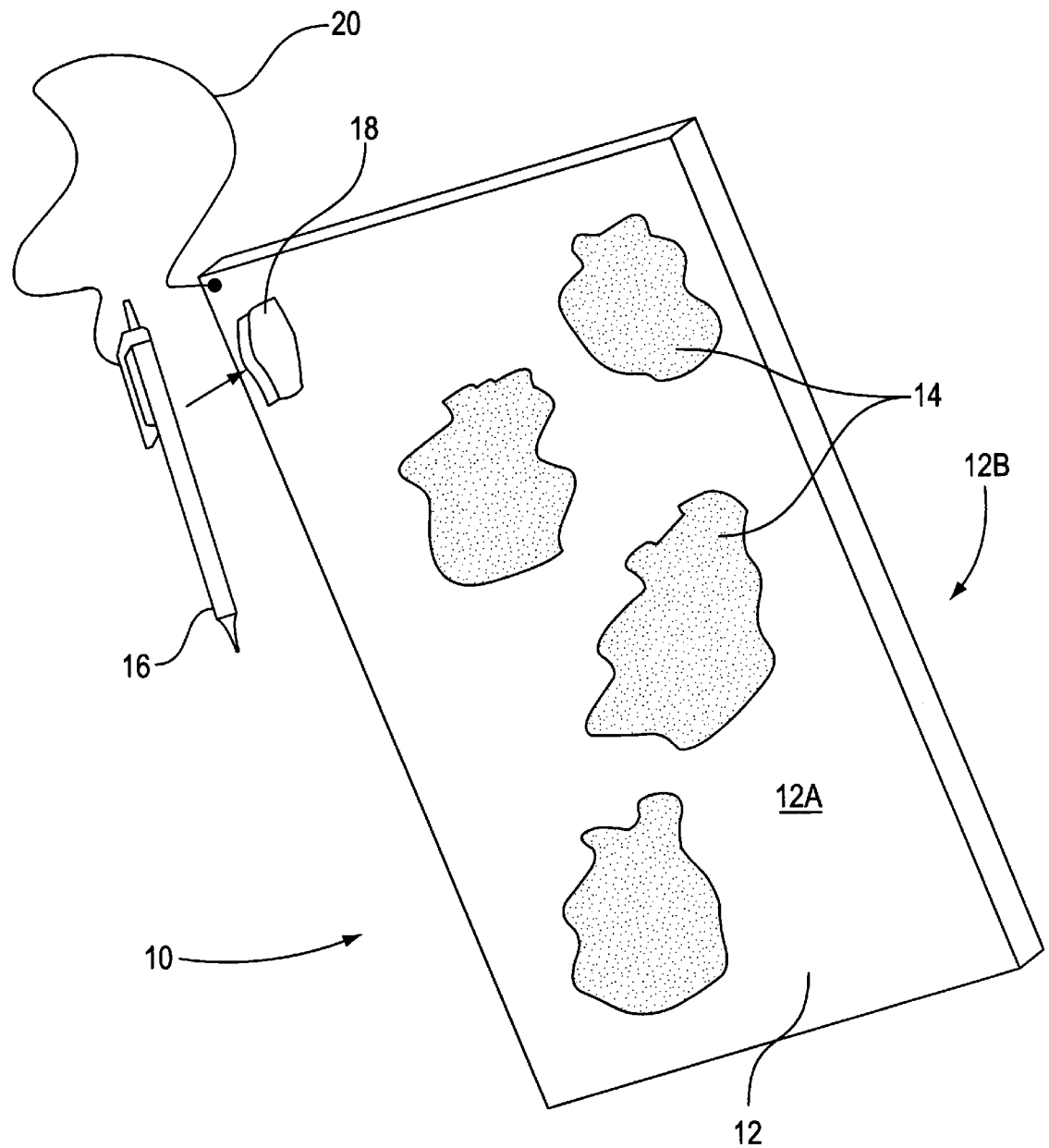
FIG. 1 is perspective view of one embodiment of geography teaching apparatus of the present invention.
Figure 2:
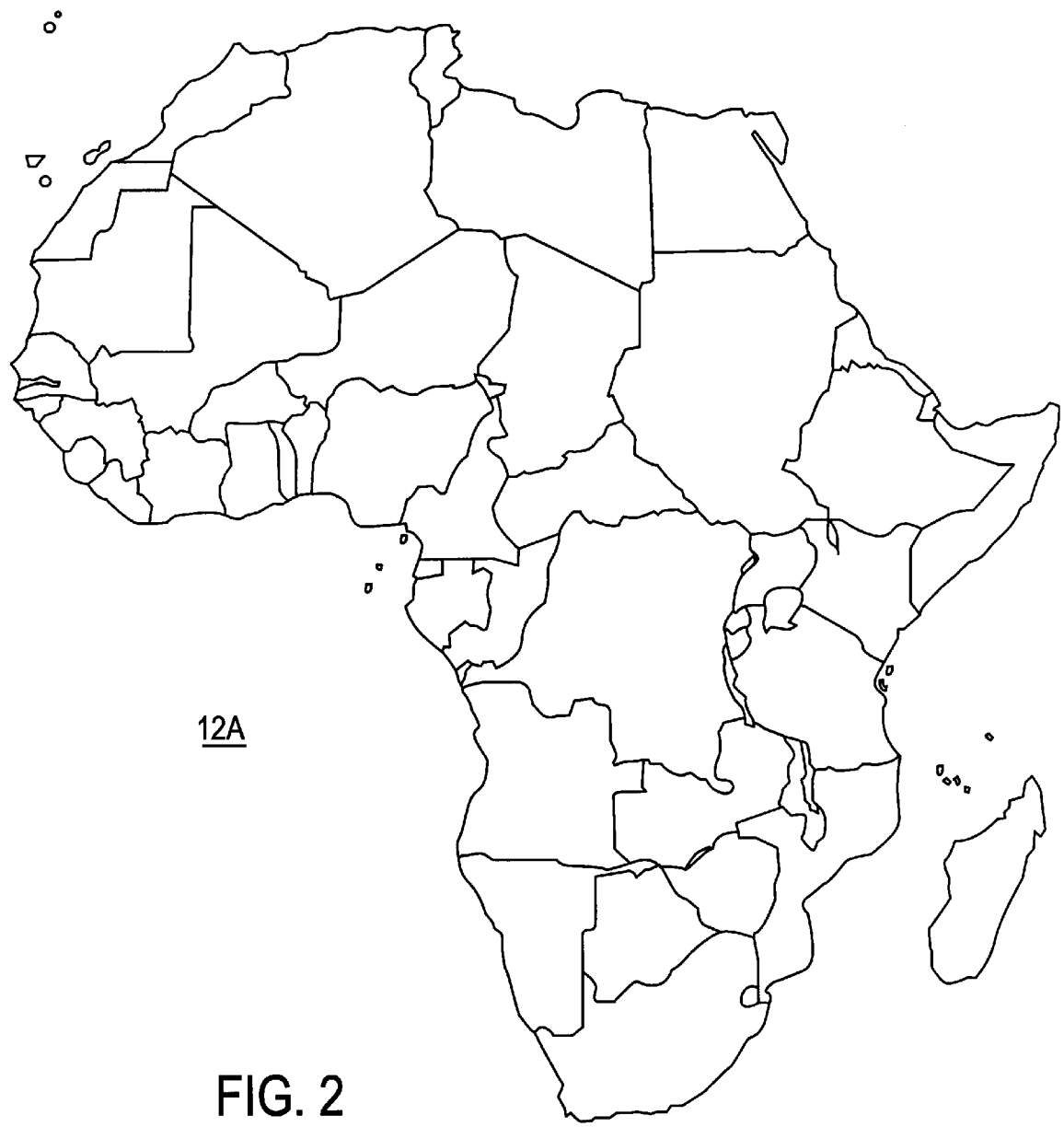
FIGS. 2 and 3 show opposite sides of one embodiment of the geography teaching apparatus of FIG. 1.
Figure 3:
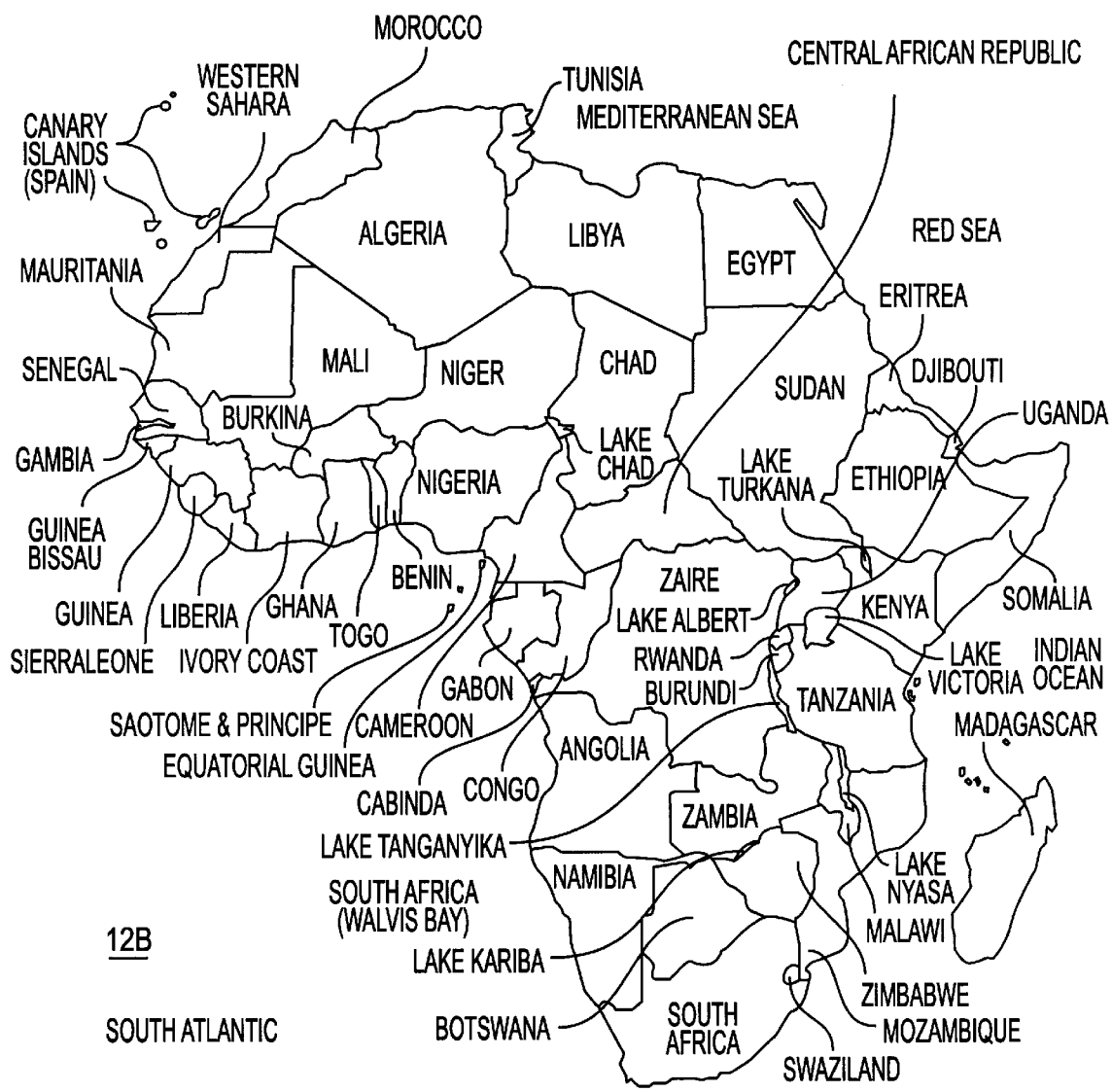

With reference to FIG. 1, one preferred embodiment of the geography teaching apparatus 10 of the present invention comprises a sheet or card 12 having graphical images 14 illustrated thereupon on both sides 12a and 12b (not shown). The graphical images 14 may comprise any images, such as representations of animals, people or things, but in the preferred embodiment comprise outlines of countries in a map form, such as shown in FIG. 2 for the continent of Africa. To provide the desired visual associations which facilitate memorization of facts associated with the images 14, the images on either side 12a and 12b of the sheet 12 are substantially the same in size and shape, and are placed on substantially the same locations on the respective sides. Compare the map image shown in FIG. 2, representing the images 14 on side 12a, to the same images shown in FIG. 3, representing the images on side 12b. The graphical images are preferably also substantially the same in color, e.g., a blue ocean with countries either a uniform color such as yellow/orange or varying in color.

The sheet 12 is a piece of 300 gram paper preferably laminated on both sides to provide rigidity to the sheet 12 and to provide working surfaces on either side of the sheet 12 which may be used repeatedly. A pen 16 with water soluble ink is preferably attached to the sheet 12 by virtue of clip 18 and/or string 20 to prevent the pens 16 from being taken or misplaced by students. The use of water soluble ink which can be easily erased from the laminated sheet 12 allows the apparatus 10 to be used many times by the same student or different students. One skilled in the art will recognize that many alternative types of easily erasable writing implements may be used to achieve the same or similar results.

Alternatively, a collection of sheets 12, such as a collection of maps of all the continents, can be assembled in bound form, as in a loose-leaf binder. The pen 16 can then be attached to the bound collection in similar fashion.

By reference to FIGS. 2 and 3, the apparatus 10 functions as follows. Students first spend time analyzing side 12b of the apparatus as shown in FIG. 3. FIG. 3 shows the map as in FIG. 2 but includes the names of the countries shown in the map at positions associated with the countries. Using the pen 16, students take notes on the surface 12b of the sheet, such as additional facts about the countries told to them by a teacher, helpful hints for remembering the identities of the countries, or pronunciations for the country names. After spending time interacting with and trying to memorize the information on side 12b, students then turn the sheet 12 over and try to write down on the country images 14 on side 12a as much information as they can remember about the countries, including names, etc. When this is done, students then turn the sheet 12 back over and assess their performance. When water soluble ink is used, students can erase their writings on sides 12a and 12b and repeat the exercise.

Many alternatives are of course possible using the same basic apparatus. For example, a board game may be made to help students learn geography and to test their knowledge in a competitive environment. The board game comprises two opposing working surfaces as in FIGS. 1–3 containing a map of the entire world. After studying the side of the board containing the textual information, students take turns answering questions or locating countries based on the selection of cards, the roll of dice, or similar well-known methods. Alternatively, the board game can have one working surface containing only the map without text, and transparent plastic overlays can be provided, either attached to the board or provided separately, each having textual information relating to the countries in the map in places corresponding to the locations of the countries, as described further below. Multiple such overlays could then be provided with the game, each having different textual information, thus providing different levels of difficulty for the students.

As a further alternative, a disposable version of the apparatus 10 may be made for the purpose of testing students' memory skills and attention spans.

Figure 4:
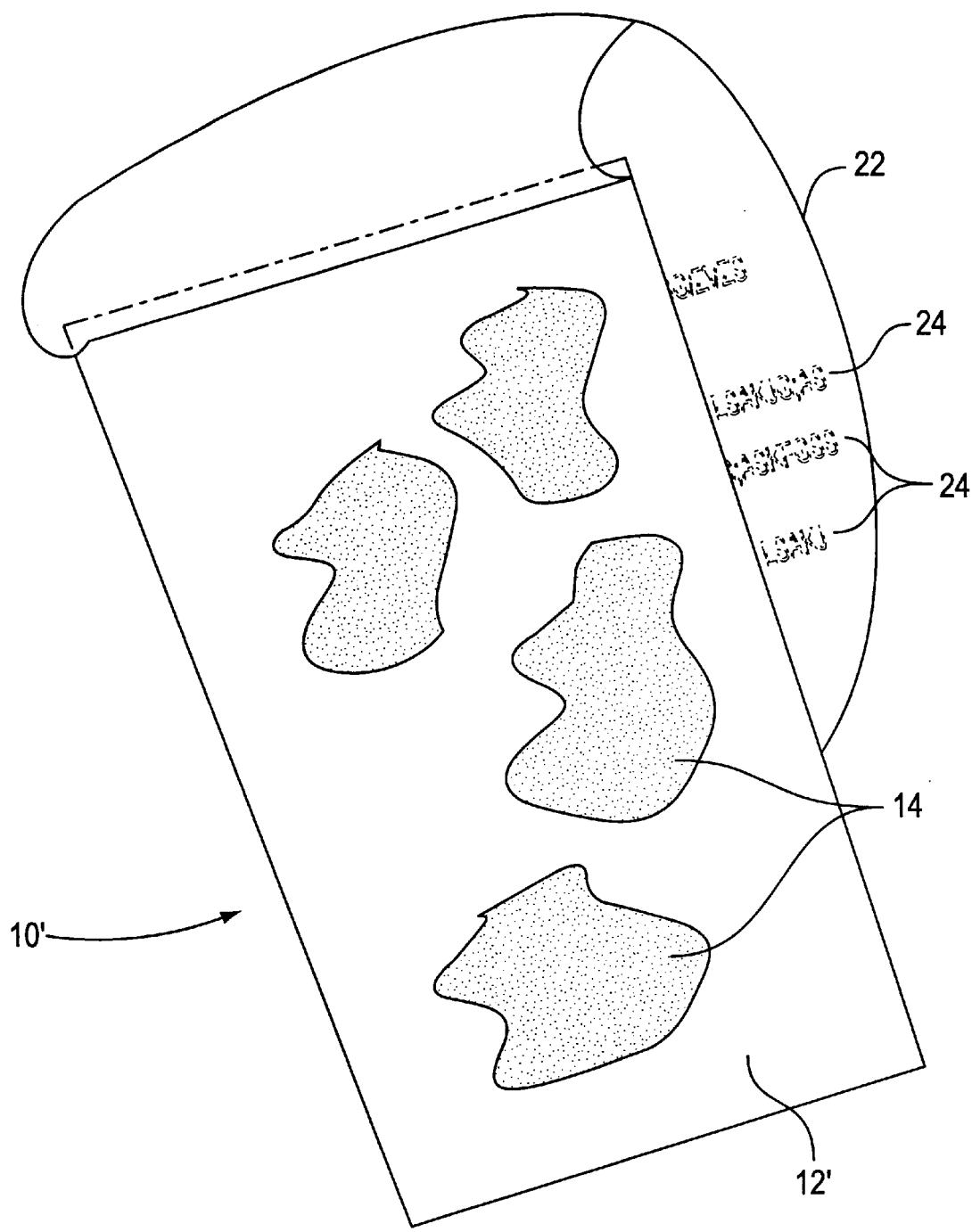
FIGS. 4 and 5 are perspective views of another embodiment of the geography teaching apparatus of the present invention.
Figure 5:
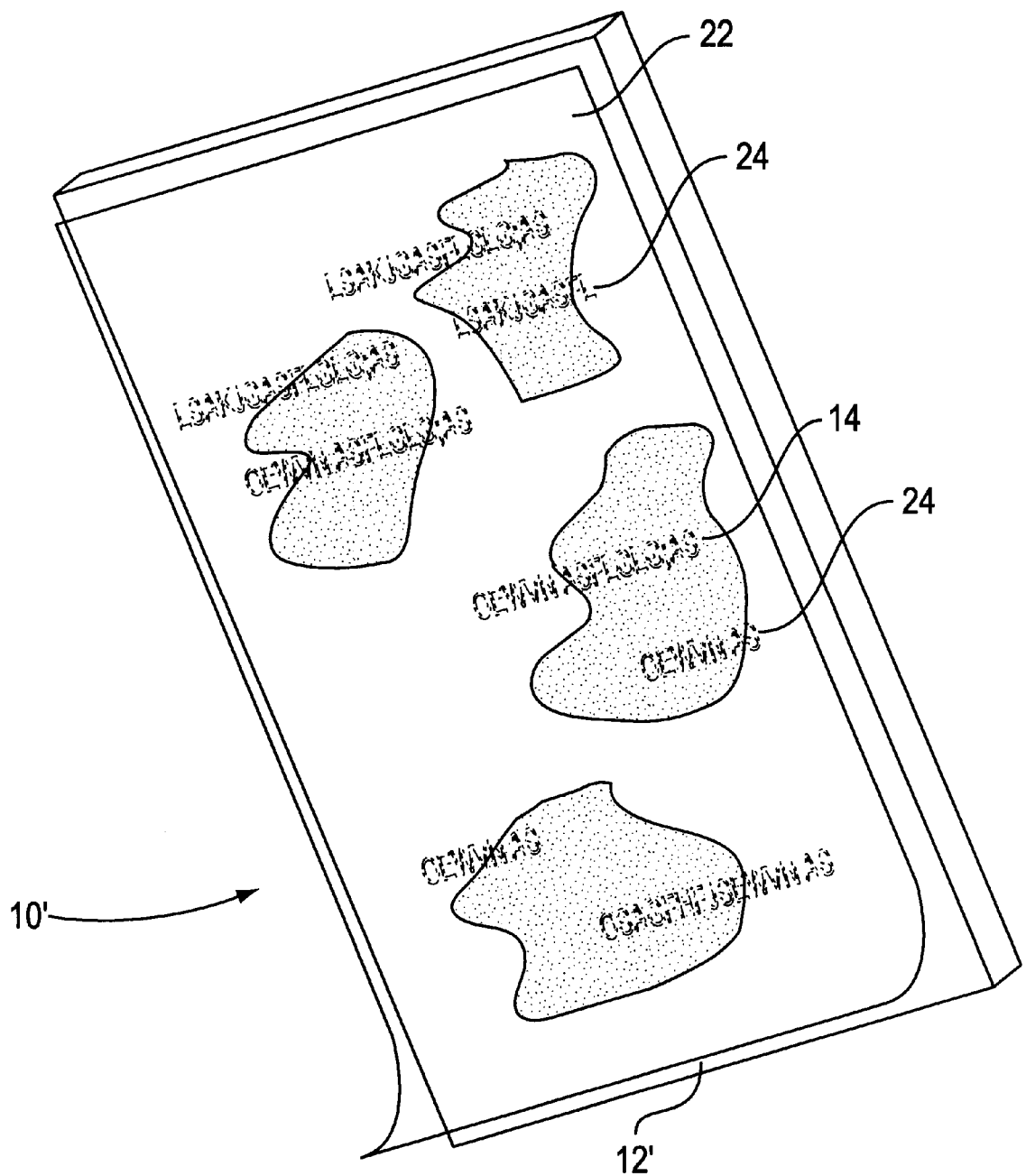

An alternative embodiment of the present invention is shown in FIGS. 4 and 5. The apparatus 10' comprises a sheet 12' similar to the sheet 12 as discussed above, but with graphical images 14 on only one side. A transparent plastic sheet 22 is attached to one edge of the sheet 12' so that it may be placed on the sheet 12' as shown in FIG. 5 or lifted away from the sheet 12' as shown in FIG. 4. The plastic sheet 22 contains printed thereupon textual information 24 relating to the graphical images and placed in positions associated with the graphical images when the plastic sheet 22 is laid over the sheet 12'. A pen 16 may also be attached to the sheet 12'.

Similar to the previously discussed embodiments, students may lay the plastic sheet 22 on the sheet 12' as shown in FIG. 5 to study the textual information 24 in visual association with the graphical images 14 and write on the plastic sheet 22, and then lift the plastic sheet 22 away from the sheet 12' to test their knowledge by writing directly on the surface of the sheet 12'.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A teaching apparatus comprising:
 a first working surface upon which is illustrated a plurality of first graphical images in first shapes, sizes and relative positions on the first working surface; and
 a second working surface coupled to the first working surface, the second working surface containing second graphical images which are substantially the same as the first graphical images and which have shapes, sizes and relative positions on the second working surface which are substantially the same as the shapes, sizes and positions;
 wherein the second working surface further illustrates textual information relating to the second graphical images, the textual information being associated on the second working surface with the second graphical images.

2. The teaching apparatus of claim 1 wherein the first and second working surfaces are on opposite sides of a piece of paper.

3. The teaching apparatus of claim 1 wherein the first and second working surfaces each comprise a single piece.

4. The teaching apparatus of claim 1 wherein the textual information comprises a plurality of identifiers, each identifier identifying one of the plurality of second graphical images and being positioned on the second working surface in at least partially overlapping relation to the second graphical image which the identifier identifies.

5. The teaching apparatus of claim 1 wherein the first and second graphical images are identical in shape and size.

6. The teaching apparatus of claim 5 wherein the relative positions of the first and second graphical images on their respective working surfaces are identical.

7. The teaching apparatus of claim 6 wherein the textual information comprises a plurality of identifiers, each identifier identifing one of the plurality of second graphical images and being positioned on the second working surface in at least partially overlapping relation to the second graphical image which the identifier identifies.

8. The teaching apparatus of claim 7 wherein the first and second working surfaces each comprise a single piece.

9. A method for learning geography using a teaching apparatus, the teaching apparatus comprising first and second working surfaces each containing images representing the outlines of countries, the images contained on the first working surface being substantially identical in shape, size and relative position as the images contained on the second working surface, the second working surface further containing text relating to a plurality of the countries contained thereupon, the method comprising:

(a) studying the second working surface in an attempt to memorize the text contained thereupon in relation to the country images relating thereto;

(b) removing the second working, surface from view;

(c) writing in relation to the country images on the first working surface whatever textual information is remembered from studying the second working surface; and (d) comparing the textual information written on the first working surface with the text contained on the second working surface.

10. The method of claim 9, comprising erasing the textual information written on the first working surface and repeating steps (a)–(d).

11. The method of claim 9, wherein the first and second working surfaces are on opposing sides of a substrate, and wherein the step of removing the second working surface from view comprises turning the substrate over from the second surface to the first surface.

12. A teaching apparatus comprising:

a first working surface upon which is illustrated a plurality of first graphical images in first relative positions on the first working surface; and a transparent sheet coupled along an edge thereof to the first working surface such that the sheet may be selectively laid directly over the first working surface or lifted therefrom, the transparent sheet containing a plurality of identifiers each identifing one of the first graphical images and being positioned in relative positions on the first transparent sheet such that each identifier substantially overlays its identifying graphical image when the sheet is laid directly over the first working surface.

* * * * *